US009735843B2

(12) United States Patent
Kummetz et al.

(10) Patent No.: US 9,735,843 B2
(45) Date of Patent: *Aug. 15, 2017

(54) BASE STATION ROUTER FOR DISTRIBUTED ANTENNA SYSTEMS

(71) Applicant: CommScope Technologies LLC, Hickory, NC (US)

(72) Inventors: Thomas Kummetz, Kissing (DE); Matthew Thomas Melester, McKinney, TX (US); Stefan Eisenwinter, Buchdorf (DE); Morgan C. Kurk, Sachse, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,161

(22) Filed: Jul. 18, 2016

(65) Prior Publication Data
US 2016/0329933 A1 Nov. 10, 2016

Related U.S. Application Data

(63) Continuation of application No. 13/546,425, filed on Jul. 11, 2012, now Pat. No. 9,398,464.
(Continued)

(51) Int. Cl.
H04W 40/00 (2009.01)
H04B 7/022 (2017.01)
(Continued)

(52) U.S. Cl.
CPC ........... *H04B 7/022* (2013.01); *H04B 17/318* (2015.01); *H04L 49/40* (2013.01); *H04W 16/04* (2013.01);
(Continued)

(58) Field of Classification Search
CPC ... H04W 16/24; H04W 88/085; H04W 16/06; H04W 72/04
(Continued)

(56) References Cited

U.S. PATENT DOCUMENTS 4,918,684 A 4/1990 Boschet et al.
5,353,332 A 10/1994 Raith et al.
(Continued)

FOREIGN PATENT DOCUMENTS

CN 101572903 11/2009
CN 101610135 12/2009
(Continued)

OTHER PUBLICATIONS

U.S. Patent Office, "Final Office Action", "from U.S. Appl. No. 13/546,425", Feb. 24, 2015, pp. 1-27, Published in: US.
(Continued)

Primary Examiner — Charles Appiah
Assistant Examiner — Jaime Holliday
(74) Attorney, Agent, or Firm — Fogg & Powers LLC

(57) ABSTRACT

Certain aspects are directed to a base station router disposed in a distributed antenna system. The base station router includes a backplane and a controller. The backplane can manage an availability of sectors for coverage zones. Each sector can include communication channels to be radiated to mobile devices in the coverage zones and can represent an amount of telecommunication capacity. The controller can respond to a traffic indicator by causing the backplane to redistribute the availability of at least one sector. The sector can be redistributed from a first coverage zone to a second coverage zone.

20 Claims, 8 Drawing Sheets

Related U.S. Application Data

(60) Provisional application No. 61/506,363, filed on Jul. 11, 2011.

(51) Int. Cl.

| | | |
|---|---|---|
| *H04W 16/04* | (2009.01) | |
| *H04W 16/26* | (2009.01) | |
| *H04B 17/318* | (2015.01) | |
| *H04L 12/931* | (2013.01) | |
| *H04W 28/08* | (2009.01) | |
| *H04W 16/06* | (2009.01) | |
| *H04W 16/24* | (2009.01) | |
| *H04W 88/08* | (2009.01) | |

(52) U.S. Cl.
CPC ........... *H04W 16/26* (2013.01); *H04W 28/08* (2013.01); *H04W 16/06* (2013.01); *H04W 16/24* (2013.01); *H04W 88/085* (2013.01)

(58) Field of Classification Search
USPC .................................................. 455/446–448
See application file for complete search history.

(56) References Cited

U.S. PATENT DOCUMENTS

| | | | |
|---|---|---|---|
| 5,507,007 | A | 4/1996 | Gunmar et al. |
| 5,574,466 | A | 11/1996 | Reed et al. |
| 5,594,350 | A | 1/1997 | Koizumi et al. |
| 5,621,786 | A | 4/1997 | Fischer et al. |
| 5,627,879 | A | 5/1997 | Russell et al. |
| 5,642,405 | A | 6/1997 | Fischer et al. |
| 5,644,622 | A | 7/1997 | Russell et al. |
| 5,657,374 | A | 8/1997 | Russell et al. |
| 5,682,256 | A | 10/1997 | Motley et al. |
| 5,694,082 | A | 12/1997 | Schmidt |
| 5,748,001 | A | 5/1998 | Cabot |
| 5,852,651 | A | 12/1998 | Fischer et al. |
| 5,889,494 | A | 3/1999 | Reudink et al. |
| 5,909,642 | A | 6/1999 | Suzuki |
| 6,009,129 | A | 12/1999 | Kenney et al. |
| 6,047,199 | A | 4/2000 | DeMarco |
| 6,128,500 | A | 10/2000 | Raghavan et al. |
| 6,144,692 | A | 11/2000 | Beck |
| 6,366,776 | B1 | 4/2002 | Wright et al. |
| 6,418,327 | B1 | 7/2002 | Carey et al. |
| 6,646,449 | B2 | 11/2003 | Seppinen et al. |
| 6,704,545 | B1 | 3/2004 | Wala |
| 6,708,036 | B2 * | 3/2004 | Proctor ................. H04W 16/14 455/424 |
| 6,731,237 | B2 | 5/2004 | Gustafson et al. |
| 6,785,558 | B1 | 8/2004 | Stratford et al. |
| 6,801,767 | B1 | 10/2004 | Schwartz et al. |
| 6,826,164 | B2 | 11/2004 | Mani et al. |
| 6,831,901 | B2 | 12/2004 | Millar |
| 6,842,431 | B2 | 1/2005 | Clarkson et al. |
| 6,873,827 | B1 | 3/2005 | Wright |
| 6,895,247 | B2 | 5/2005 | Mostafa |
| 6,937,863 | B1 | 8/2005 | Gordon et al. |
| 6,963,552 | B2 | 11/2005 | Sabat, Jr. et al. |
| 6,996,374 | B1 | 2/2006 | Bao et al. |
| 7,013,136 | B2 | 3/2006 | Frangione et al. |
| 7,025,262 | B2 | 4/2006 | Byskov et al. |
| 7,082,320 | B2 | 7/2006 | Kattukaran et al. |
| 7,120,546 | B2 | 10/2006 | Zyss et al. |
| 7,123,023 | B2 | 10/2006 | Minihold et al. |
| 7,127,175 | B2 | 10/2006 | Mani et al. |
| 7,127,211 | B2 | 10/2006 | Hildebrand et al. |
| 7,162,203 | B1 | 1/2007 | Brunner |
| 7,205,864 | B2 | 4/2007 | Schultz, Jr. et al. |
| 7,215,651 | B2 | 5/2007 | Millar |
| 7,224,170 | B2 | 5/2007 | Graham et al. |
| 7,286,507 | B1 * | 10/2007 | Oh ........................ H04W 16/26 370/312 |
| 7,313,415 | B2 | 12/2007 | Wake et al. |
| 7,398,106 | B2 | 7/2008 | Conyers et al. |
| 7,403,503 | B2 | 7/2008 | Cuffaro et al. |
| 7,423,988 | B2 | 9/2008 | Hedin et al. |
| RE40,564 | E | 11/2008 | Fischer et al. |
| 7,469,105 | B2 | 12/2008 | Wake et al. |
| 7,474,635 | B2 | 1/2009 | Linsky et al. |
| 7,574,234 | B2 | 8/2009 | Conyers et al. |
| 7,639,982 | B2 | 12/2009 | Wala |
| 7,640,019 | B2 | 12/2009 | Conyers et al. |
| 7,702,985 | B2 | 4/2010 | Millar |
| 7,761,093 | B2 | 7/2010 | Sabat, Jr. et al. |
| 7,787,854 | B2 | 8/2010 | Conyers et al. |
| 7,876,867 | B2 | 1/2011 | Filipovic et al. |
| 7,920,858 | B2 | 4/2011 | Sabat, Jr. et al. |
| 8,036,156 | B2 | 10/2011 | Hedin et al. |
| 8,160,570 | B2 | 4/2012 | Sabat, Jr. et al. |
| 8,175,540 | B2 | 5/2012 | Jones |
| 8,194,597 | B2 | 6/2012 | Feder et al. |
| 8,290,483 | B2 | 10/2012 | Sabat, Jr. et al. |
| 8,326,218 | B2 | 12/2012 | Wala |
| RE43,964 | E | 2/2013 | Fischer et al. |
| RE44,398 | E | 7/2013 | Conyers et al. |
| 8,515,339 | B2 | 8/2013 | Yona et al. |
| 8,542,768 | B2 | 9/2013 | Kim et al. |
| 8,559,939 | B2 | 10/2013 | Sabat, Jr. et al. |
| 8,577,286 | B2 | 11/2013 | Wala |
| 8,583,100 | B2 | 11/2013 | Koziy et al. |
| 8,682,338 | B2 | 3/2014 | Lemson et al. |
| 8,724,664 | B2 | 5/2014 | Stapleton et al. |
| 8,737,300 | B2 | 5/2014 | Stapleton et al. |
| 8,737,454 | B2 | 5/2014 | Wala et al. |
| 8,817,848 | B2 | 8/2014 | Lemson et al. |
| 8,824,595 | B2 | 9/2014 | Kim et al. |
| 8,831,593 | B2 | 9/2014 | Melester et al. |
| 8,848,766 | B2 | 9/2014 | Lemson et al. |
| RE45,321 | E | 1/2015 | Fischer et al. |
| 9,025,956 | B2 | 5/2015 | Stapleton et al. |
| 9,048,797 | B2 | 6/2015 | Kim et al. |
| 9,137,078 | B2 | 9/2015 | Stapleton et al. |
| 9,148,203 | B2 | 9/2015 | Lemson et al. |
| 9,148,324 | B2 | 9/2015 | Stapleton et al. |
| 9,197,358 | B2 | 11/2015 | Hejazi et al. |
| 9,236,897 | B2 | 1/2016 | Stapleton et al. |
| 2002/0094785 | A1 | 7/2002 | Deats |
| 2003/0039319 | A1 | 2/2003 | Engelse et al. |
| 2003/0040329 | A1 | 2/2003 | Yona et al. |
| 2003/0073463 | A1 | 4/2003 | Shapira |
| 2003/0153273 | A1 | 8/2003 | Ebert et al. |
| 2005/0102449 | A1 | 5/2005 | Durston |
| 2005/0157675 | A1 | 7/2005 | Feder et al. |
| 2005/0259684 | A1 | 11/2005 | Csapo |
| 2006/0002326 | A1 | 1/2006 | Vesuna |
| 2006/0019671 | A1 | 1/2006 | Rappaport et al. |
| 2006/0094470 | A1 | 5/2006 | Wake et al. |
| 2007/0010224 | A1 | 1/2007 | Shi |
| 2007/0213006 | A1 | 9/2007 | Wong et al. |
| 2007/0259625 | A1 | 11/2007 | Tolaio et al. |
| 2008/0039089 | A1 | 2/2008 | Berkman et al. |
| 2008/0287083 | A1 | 11/2008 | Payne, IV |
| 2008/0298445 | A1 | 12/2008 | Richardson et al. |
| 2009/0017835 | A1 | 1/2009 | Song et al. |
| 2009/0086028 | A1 | 4/2009 | Miller et al. |
| 2009/0239475 | A1 | 9/2009 | Lehman |
| 2010/0029237 | A1 | 2/2010 | Yamamoto et al. |
| 2010/0085061 | A1 | 4/2010 | Bradley et al. |
| 2010/0113006 | A1 | 5/2010 | Pajjuri et al. |
| 2010/0128676 | A1 | 5/2010 | Wu et al. |
| 2010/0164504 | A1 | 7/2010 | Bradley |
| 2010/0178936 | A1 | 7/2010 | Wala et al. |
| 2010/0197238 | A1 | 8/2010 | Pathuri et al. |
| 2010/0202356 | A1 | 8/2010 | Fischer et al. |
| 2010/0260103 | A1 | 10/2010 | Guey et al. |
| 2010/0278530 | A1 | 11/2010 | Kummetz et al. |
| 2010/0295533 | A1 | 11/2010 | Kuga et al. |
| 2011/0059709 | A1 | 3/2011 | Collins, III |
| 2011/0105184 | A1 | 5/2011 | Piirainen et al. |
| 2011/0135308 | A1 | 6/2011 | Tarlazzi et al. |
| 2011/0151839 | A1 | 6/2011 | Bolon et al. |
| 2011/0158081 | A1 | 6/2011 | Wang et al. |

(56) References Cited

U.S. PATENT DOCUMENTS

| | | |
|---|---|---|
| 2011/0164878 A1 | 7/2011 | Ma et al. |
| 2011/0194548 A1 | 8/2011 | Feder et al. |
| 2011/0201269 A1 | 8/2011 | Hobbs et al. |
| 2012/0039254 A1 | 2/2012 | Stapleton et al. |
| 2012/0093269 A1 | 4/2012 | Yu et al. |
| 2012/0155572 A1 | 6/2012 | Kim et al. |
| 2013/0017863 A1 | 1/2013 | Kummetz et al. |
| 2013/0071112 A1 | 3/2013 | Melester et al. |
| 2013/0114486 A1 | 5/2013 | Spedaliere et al. |
| 2013/0114963 A1 | 5/2013 | Stapleton et al. |
| 2013/0128810 A1 | 5/2013 | Lee et al. |
| 2013/0182753 A1 | 7/2013 | Delforce et al. |
| 2014/0010168 A1 | 1/2014 | Stapleton et al. |
| 2014/0036770 A1 | 2/2014 | Stapleton et al. |
| 2014/0057627 A1 | 2/2014 | Hejazi et al. |
| 2014/0079153 A1 | 3/2014 | Kim et al. |
| 2014/0119197 A1 | 5/2014 | Maca et al. |
| 2014/0206282 A1 | 7/2014 | Stapleton et al. |
| 2014/0233468 A1 | 8/2014 | Hejazi et al. |
| 2014/0286247 A1 | 9/2014 | Lemson et al. |
| 2014/0313884 A1 | 10/2014 | Stapleton et al. |
| 2015/0080054 A1 | 3/2015 | Kim et al. |

FOREIGN PATENT DOCUMENTS

| | | |
|---|---|---|
| CN | 101635590 | 1/2010 |
| CN | 102077683 | 5/2011 |
| CN | 103733664 | 4/2014 |
| CN | 103875270 | 6/2014 |
| CN | 103891179 | 6/2014 |
| EP | 1081883 | 3/2001 |
| EP | 2661828 | 11/2013 |
| EP | 2732653 | 5/2014 |
| EP | 2756619 | 7/2014 |
| JP | 2002190780 | 7/2002 |
| JP | 2005151189 | 6/2005 |
| KR | 19980067669 | 10/1998 |
| KR | 20020041516 | 6/2002 |
| KR | 2005049070 | 5/2005 |
| KR | 2006120361 | 11/2006 |
| KR | 20070118460 | 12/2007 |
| KR | 2008086604 | 9/2008 |
| KR | 2009080762 | 7/2009 |
| WO | 9739597 | 10/1997 |
| WO | 2005109700 | 11/2005 |
| WO | 2007044653 | 4/2007 |
| WO | 2008027213 | 3/2008 |
| WO | 2008088862 | 7/2008 |
| WO | 2009023159 | 2/2009 |
| WO | 2009039396 | 3/2009 |
| WO | 2009082084 | 7/2009 |
| WO | 2013009835 | 1/2013 |
| WO | 2013033199 | 3/2013 |
| WO | 2013040579 | 3/2013 |
| WO | 2013040589 | 3/2013 |

OTHER PUBLICATIONS

U.S. Patent Office, "Notice of Allowance", "from U.S. Appl. No. 13/546,425", Nov. 20, 2015, pp. 1-16, Published in: US.

U.S. Patent Office, "Notice of Allowance", "from U.S. Appl. No. 13/546,425", Mar. 14, 2016, pp. 1-21, Published in: US.

U.S. Patent Office, "Office Action", "from U.S. Appl. No. 13/546,425", Jul. 31, 2014, pp. 1-27, Published in: US.

China Patent Office, "Office Action from CN Application No. 201280038059.9," "from Foreign Counterpart to U.S. Appl. No. 15/213,161", Oct. 10, 2016, pp. 1-17, Published in: CN.

European Patent Office, "Extended European Search Report for EP Application No. 12826731.7", "from Foreign Counterpart to U.S. Appl. No. 13/597,900", Mar. 12, 2015, pp. 1-10, Published in: EP.

International Search Authority, "International Search Report for PCT Application No. PCT/US2012/052845", "from Foreign Counterpart to U.S. Appl. No. 13/597,900", Jan. 30, 2013, pp. 1-8, Published in: WO.

U.S. Patent Office, "Notice of Allowance", "from U.S. Appl. No. 13/978,966", Jan. 21, 2015, pp. 1-11, Published in: US.

U.S. Patent Office, "Office Action", "from U.S. Appl. No. 13/978,966", Apr. 15, 2014, pp. 1-34, Published in: US.

U.S. Patent Office, "Office Action", "from U.S. Appl. No. 13/978,966", Sep. 5, 2014, pp. 1-32, Published in: US.

International Search Authority, "International Preliminary Report on Patentability for PCT/US2012/055793", "from Foreign Counterpart to U.S. Appl. No. 13/978,966", Mar. 27, 2014, pp. 1-6, Published in: WO.

International Search Authority, "International Search Report and Written Opinion for PCT/US2012/055793", "from Foreign Counterpart to U.S. Appl. No. 13/978,966", Dec. 28, 2012, pp. 1-9, Published in: WO.

China Patent Office, "Office Action for CN Application No. CN 201280050939.8", "from Foreign Counterpart to U.S. Appl. No. 13/621,504", Dec. 3, 2014, pp. 1-11, Published in: CN.

U.S. Patent Office, "Notice of Allowance", "from U.S. Appl. No. 13/621,504", Jun. 18, 2014, pp. 1-7, Published in: US.

U.S. Patent Office, "Office Action", "from U.S. Appl. No. 13/621,504", Feb. 13, 2014, pp. 1-28, Published in: US.

Bell et al., "Range to Fault Technology", "http://www.livingston.co.uk/files/bestanden/rtfwhitepaper.pdf", Jan. 1, 2011, pp. 1-10, Publisher: Kaelus, Inc.

Brahmanapally et al., "Analysis and Determination of intermodulation hits in Mobile Communication", "Proceedings of the 8th WSEAS International Conference on Data Networks, Communcations, Computers, DNCOCO'09 (Provided one page abstract only)", Nov. 7, 2009, pp. 130-134.

Chalmers, "Detecting and Correcting Intermodulation", "Global Communications (Provided one page abstract only)", Jan. 1, 1985, pp. 22-25, vol. 7, No. 1.

European Patent Office, "Extended European Search Report for EP 12832171.8", Apr. 24, 2014, pp. 1-9, Published in: EP.

Feng et al., "Downlink Capacity of Distributed Antenna Systems in a Multi-Cell Environment", "Communications and Networking", Sep. 1, 2010, pp. 173-186.

Heath, Jr. et al., "Multiuser MIMO in Distributed Antenna Systems", "Signals, Systems and Computers (ASILOMAR), 2010 Conference Record of the Forty Fourth Asilomar Conference", Nov. 1, 2010, pp. 1-5.

"An Introduction to Neutral Host Distributed Antenna Systems", Nov. 7, 2004, pp. 1-14, Publisher: Infinigy Networks.

Nash, "Intermodulation Distortion Problems at UMTS Cell Sites", "http://www.aeroflex.com/ats/products/prodfiles/articles/8814/Intermod.pdf", Jan. 3, 2010, pp. 1-10, Publisher: Aeroflex Wireless Test Solutions, Published in: Burnham, UK.

International Search Authority, "International Preliminary Report on Patentability for PCT/US2012/046207", Jan. 23, 2014, pp. 1-8, Published in: WO.

International Search Authority, "International Search Report and Written Opinion from PCT Application No. PCT/US2012/046207", Nov. 15, 2012, pp. 1-11, Published in: WO.

International Search Authority, "International Preliminary Report on Patentability for PCT/US2012/055793", Mar. 27, 2014, pp. 1-6, Published in: WO.

International Search Report, "International Search Report from PCT/US2012/055807", Dec. 26, 2012, pp. 1-9, Published in: WO.

Qiang et al., "Study on Computer-Based Integrated Passive Inter-Modualtion Measurement System", "Chinese Journal of Scientific Instrument (Provided one page abstract only)", Jul. 1, 2009, pp. 1540-1545.

Singh et al., "Systems and Methodology for PIM Mitigation of Communications Satellites", "4th International Workshop on Multipactor, Corona and Passive Intermodulation in Space RF Hardware", Sep. 8, 2003, pp. 1-9.

"Distributed Antenna Systems and MIMO Technology", Apr. 1, 2011, pp. 1-8, Publisher: TE Connectivity Wireless and Services.

Tolstrup, "Noise, Indoor Radio Planning", Jul. 14, 2011, pp. 295-328.

(56) References Cited

OTHER PUBLICATIONS

European Patent Office, "Communication Pursuant to Article 94(3) for EP Application No. 12740791.4", "From U.S. Appl. No. 13/546,425", May 17, 2017, pp. 17, Published in: EP.

* cited by examiner

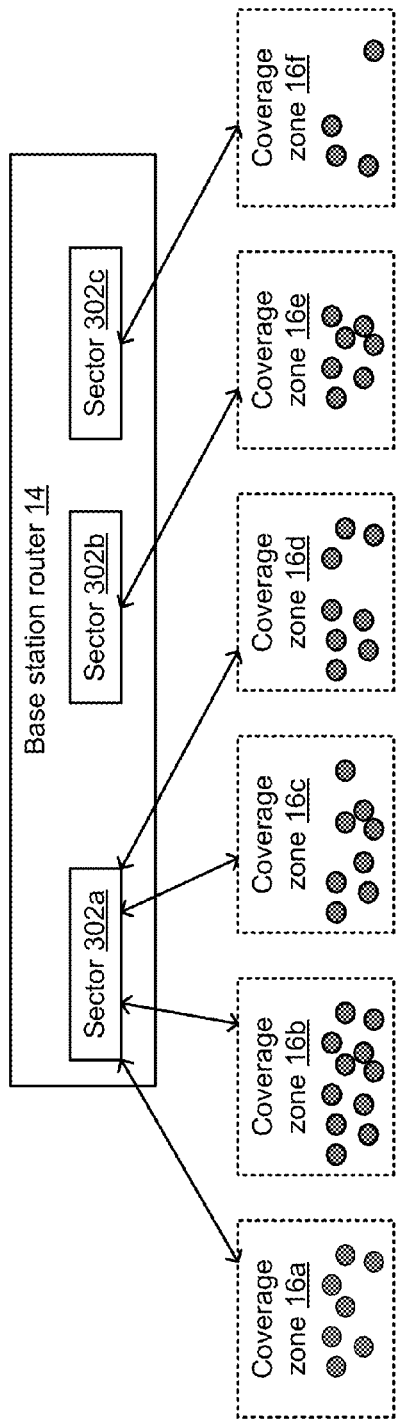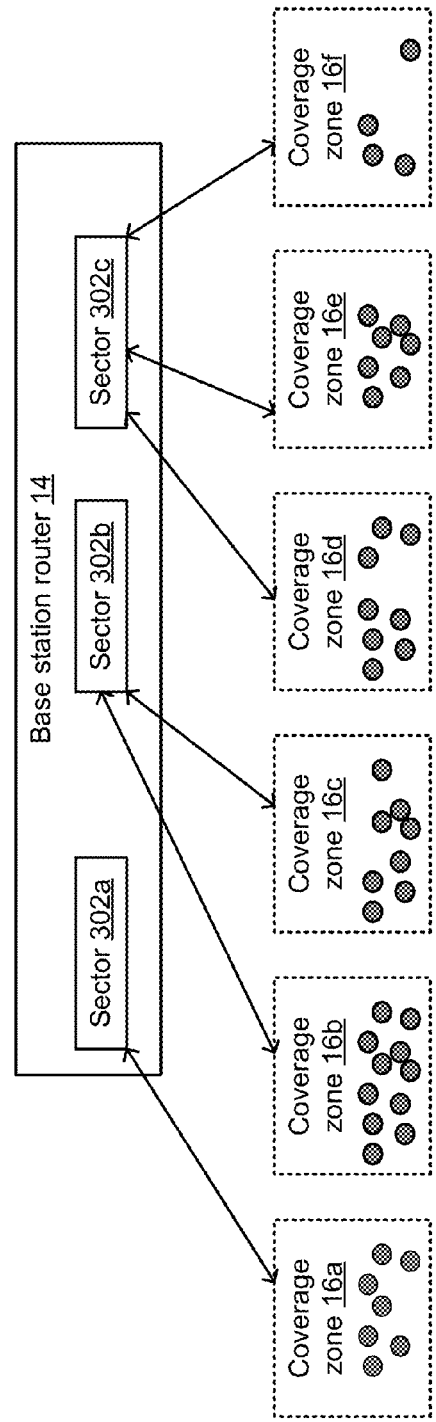

BASE STATION ROUTER FOR DISTRIBUTED ANTENNA SYSTEMS

RELATED APPLICATION

This application is a continuation application of U.S. patent application Ser. No. 13/546,425 entitled "BASE STATION ROUTER FOR DISTRIBUTED ANTENNA SYSTEMS", filed on Jul. 11, 2012 (currently pending) which claims the benefit of U.S. Provisional Application Ser. No. 61/506,363, filed Jul. 11, 2011 and titled "Intelligent Point of Interface for Distributed Antenna Systems," both of which are hereby incorporated by reference.

TECHNICAL FIELD

The present invention relates generally to telecommunications and, more particularly (although not necessarily exclusively), to a base station router for distributed antenna systems.

BACKGROUND

A distributed antenna system ("DAS") can be used to extend the coverage of a cellular communication system. For example, a DAS can extend coverage to areas of traditionally low signal coverage within buildings, tunnels, or in areas obstructed by terrain features. Cellular communication systems can include the capability to provide data services via a DAS. In locations with a higher density of wireless devices, such as stadiums, sport arenas, or similar venues, the signal capacity needed to provide signal coverage to different physical areas can change over time. Providing extra signal capacity to supply the maximum capacity to each section in a location with varying numbers of wireless devices or other mobile units can be associated with prohibitively high costs.

Systems that can connect one or more base stations to one or more DAS's to distribute signal capacity adaptively are therefore desirable.

SUMMARY

In one aspect, a base station router disposed in a distributed antenna system is provided. The base station router includes a backplane and a controller. The backplane can manage an availability of sectors for coverage zones. Each sector can include communication channels to be radiated to mobile devices in the coverage zones and can represent an amount of telecommunication capacity. The controller can respond to a traffic indicator by causing the backplane to redistribute the availability of at least one sector. The sector can be redistributed from a first coverage zone to a second coverage zone.

In another aspect, a distributed antenna system is provided. The distributed antenna system includes a first remote antenna unit, a second remote antenna unit, and a base station router. The first remote antenna unit can wirelessly communicate with mobile devices located in a first coverage zone. The second remote antenna unit can wirelessly communicate with mobile devices located in a second coverage zone. The base station router can distribute an availability of a sector to the first remote antenna unit and the second remote antenna unit. The sector can include communication channels and represent an amount of telecommunication capacity. The base station router can redistribute the availability of the sector from the first remote antenna unit to the second remote antenna unit in response to detecting a traffic indicator.

In another aspect, a method is provided. The method involves distributing an availability of a sector to a first coverage zone. The sector includes communication channels and represents an amount of telecommunication capacity. The method also involves receiving a traffic indicator. The method also involves, in response to receiving the traffic indicator, redistributing the availability of the sector from the first coverage zone to a second coverage zone.

These illustrative aspects and features are mentioned not to limit or define the invention, but to provide examples to aid understanding of the inventive concepts disclosed in this disclosure. Other aspects, advantages, and features of the present invention will become apparent after review of the entire disclosure.

BRIEF DESCRIPTION OF THE DRAWINGS

FIG. 4 is a modeling diagram of a first configuration of a base station router providing sectors to coverage zones according to one aspect.

FIG. 5 is a modeling diagram of a second configuration of a base station router providing sectors to coverage zones according to one aspect.

DETAILED DESCRIPTION

Figure 1:
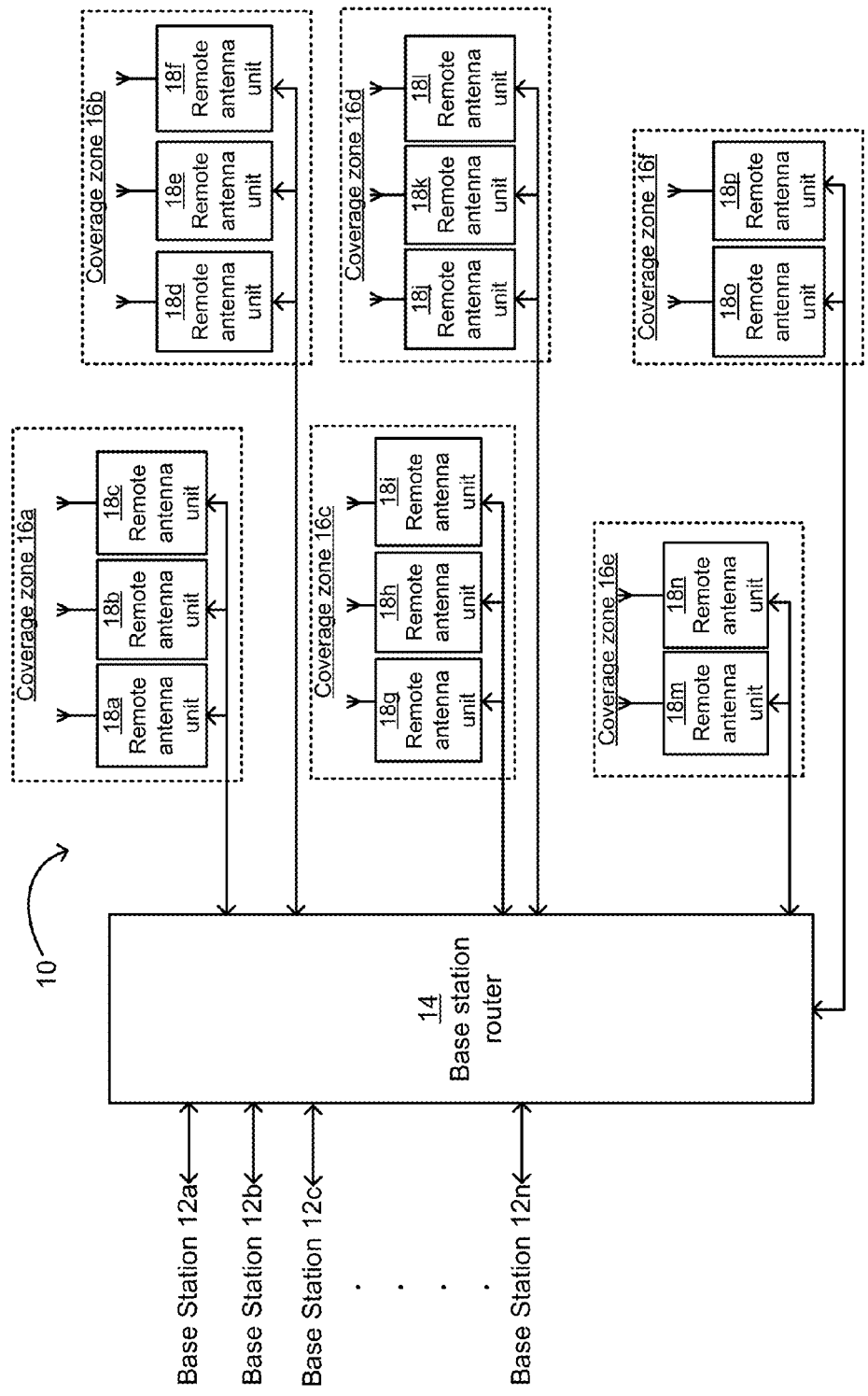
FIG. 1 is a schematic view of a distributed antenna system having a base station router according to one aspect.

Certain aspects and examples are directed to a base station router, such as a base station sector router, that can be disposed in a distributed antenna system ("DAS") and that can redistribute capacity among coverage zones serviced by the DAS. A DAS can include a unit, such as a base station router, in communication with carrier systems, such as base stations of cellular service providers. Redistributing capacity can include modifying the distribution of sectors to coverage zones of the DAS. A sector can include one or more telecommunication channels to be radiated to mobile devices in coverage zones or otherwise distributed to the coverage zones, thereby providing telecommunication capacity in the coverage zones. The sector can be distributed without further subdivision.

The base station router can provide one or more signals, such as analog RF signals or digitized RF signals, over one or more communication channels, such as (but not limited to) a serial link, to a set of remote antenna units in the coverage zone. A set of remote antenna units can include one or more antenna units.

In some aspects, the base station router can include features of an intelligent point of interface ("I-POI") system. A POI system can include a device or group of devices configured to interface directly with a base station or a group of base stations. Such devices can include (but are not limited to) a signal leveler, a signal attenuator, a signal splitter, a signal combiner, a receive-and-transmit signal combiner, a splitter, a multiplexer, and the like. An i-POI system can provide an intelligent interface for communicating with a base station or group of base stations. Providing an intelligent interface can include controlling the leveling or attenuation based on base station signal conditions. An intelligent interface can also include analyzing incoming signals and determination of system level parameters based on the analysis.

A coverage zone can include one or more remote antenna units that provide signal coverage to an area. The remote antenna units in a coverage zone can communicate with the base station router over a link. Examples of such a link can include (but are not limited to) a serial link, a digital link, an analog link, etc. The remote antenna units can wirelessly communicate the signals from the base station router to wireless devices positioned in a coverage zone.

The base station router can redistribute capacity by changing which sectors are provided to which coverage zones. A sector can represent an amount of telecommunication capacity that can be allocated to wireless devices in one or more coverage zones. Increasing the bandwidth associated with a sector can increase the capacity represented by the sector. A sector can include one or more analog RF channels or digital signals representing RF channels, signals in one or more analog or digital RF bands, and/or one or more multiple-input and multiple-output ("MIMO") data streams.

The signals of a sector can be provided to a coverage zone via the base station router. The signals of a sector can also be distributed to two or more coverage zones providing coverage to a physical area. All of the signals of a sector can be radiated by the remote antenna units of one or more coverage zones included in a physical area.

In some aspects, a first coverage zone can partially overlap a second coverage zone. The base station router can redistribute capacity such that the capacity requirements or capacity density match the provided capacity. In other aspects, a first coverage zone can be a subdivision of a second coverage zone. The base station router can distribute capacity to subdivide a larger cell into smaller cells. In other aspects, a first coverage zone and a second coverage zone may not overlap. Capacity can be redistributed in whole or in part from the first coverage zone to the second coverage zone based on the second coverage zone having a greater capacity requirement (i.e., a larger number of mobile devices).

Increasing the number of coverage zones to which a sector is distributed can decrease the capacity density of each coverage zone. Decreasing the number of coverage zones to which a sector is distributed can increase the capacity density of each zone. The level of the capacity density can determine how many mobile devices can use telecommunication services and capacity in a given coverage zone. In some aspects, a maximum capacity density can be achieved by distributing the sector to a minimum size coverage zone. A non-limiting example of a minimum size coverage zone is a single remote unit or a single antenna unit.

The base station router can shift capacity by reducing the number of coverage zones to which a sector is distributed. By distributing the sector to fewer coverage zones (and thus a smaller physical area), the capacity density (i.e., the capacity per physical area) is increased. The number of coverage zones to which a base station router distributes sectors can be greater than or equal to the number of sectors distributed by the base station router.

An example of shifting capacity can include modifying the respective capacity in two coverage zones. More wireless devices may be concentrated in a first zone than are concentrated in a second coverage zone. The base station router can sub-divide a combined coverage zone including both the first coverage zone and the second coverage zone. The base station router can shift the distribution of capacity between the two coverage zones such that the capacity is distributed only to the first coverage zone rather than the combined first and second coverage zones.

Sectors from base stations associated with different telecommunications system operators can be distributed to one or more common coverage zones. The base station router can allocate the respective capacities of different telecommunications system operators among coverage zones such that different capacity densities are associated with different telecommunication system operators within a specific coverage zone. For example, four sectors of a first telecommunication system operator may be distributed among six coverage zones and two sectors of a second telecommunication system operator may be distributed among the same six coverage zones. The capacity density for the first telecommunication system operator thus exceeds the capacity density for the second telecommunication system operator in the same physical area that includes the six coverage zones.

A base station router can include donor interface cards, a backplane, and zone interface cards. A donor interface card can interface with a base station for bi-directional communication of sector signals and can provide the signals of a sector to the backplane. The backplane can route signals from donor cards to one or more zone interface cards. The base station router can provide signals of a sector via the zone interface card to one or more remote antenna units in a coverage zone. The communication with the backplane can include using either analog signals formats or digital signal formats. In some aspects, the routing function can be implemented on each zone interface card by a selection mechanism from multiple signals provided by the backplane. In other aspects, the routing function can be implemented by a selection mechanism residing on the backplane. The routing function can be pre-determined, configurable by an operator, or configurable by an algorithm executed by a processing device.

A base station router can also determine the location of a specific wireless device within the environment of the DAS. The base station router can communicate with a base station to determine an identifier for the specific wireless device. The base station router can also determine a channel over which the specific wireless device is communicating. A channel can include a connection, such as a transmit and receive frequency, over which a wireless device and a base station can communicate via the DAS. The base station router can determine a coverage zone to which the channel is being provided and a specific remote antenna unit in a coverage zone that is associated with the wireless device. The base station router can determine which remote antenna unit is associated with the wireless device by determining the received signal strength indicator ("RSSI") of an uplink signal from the wireless device at each remote antenna unit. The remote antenna unit associated with the wireless device receives the uplink signal at the strongest RSSI. The base station router can access a data file that includes the location of each remote antenna unit to determine, based on which remote antenna unit is communicating with the wireless device, the location of the wireless device.

A base station router can also include a separate interface card for connecting the base station router to another base station router in the DAS. Interconnecting multiple base station routers can increase the number of coverage zones supported by a sector. The interconnections between multiple base station routers can use different media. Examples of interconnections between base station routers can include (but are not limited to) wired connections, optical connections, free-air paths, etc. Examples of wired connections can include (but are not limited to) coaxial cables and twisted pair cables. Examples of optical connections can include optical fiber or other optical guides. Examples of free-air paths can include using radiated RF signals or radiated optical signals.

Detailed descriptions of these illustrative examples are discussed below. These illustrative examples are given to introduce the reader to the general subject matter discussed here and are not intended to limit the scope of the disclosed concepts. The following sections describe various examples with reference to the drawings in which like numerals indicate like elements, and directional descriptions are used to describe the illustrative examples but, like the illustrative examples, should not be used to limit the present invention.

FIG. 1 depicts a DAS 10 having a base station router 14 in communication with base stations 12a-n and with remote antenna units 18a-p of coverage zones 16a-f. The DAS 10 can be positioned in an area, such as a stadium, office building or other confined environments, to extend wireless communication coverage of the base stations 12a-n. Different base stations 12a-n can be associated with different sectors of one telecommunication system operator and/or be associated with different sectors of different telecommunication system operators.

In the downlink direction, the DAS 10 can receive signals from the base stations 12a-n via a wired or wireless communication medium. Downlink signals can include signals provided from the base stations 12a-n and radiated into the coverage zones 16a-f by the remote antenna units 18a-p. The downlink signals received by the base station router 14 can be associated with one or more sectors from the base stations 12a-n.

The base station router 14 can communicate sectors between the base stations 12a-n and the coverage zones 16a-f. Each of the coverage zones 16a-f can correspond to a physical area within the environment of the DAS 10. The DAS 10 can distribute a sector to a single physical area that includes multiple coverage zones. The remote antenna units in the coverage zones of the physical area can radiate the signals of the sector distributed to the physical area. In some aspects, a remote antenna unit can include signal processing circuitry. In other aspects, a remote antenna unit can be an antenna without any additional circuitry.

The base station router 14 can include circuitry for processing the signals communicated between the base stations 12a-n and the coverage zones 16a-f. Processing the signals can include transforming the signals received from the base stations 12a-n into a digital format. Processing the signals can also include filtering downlink signals from the base stations 12a-n.

The base station router 14 can also include circuitry for routing signals from the base stations 12a-n to the remote antenna units 16a-f. Routing the signals can include combining the signals of the sectors from one or more base stations 12a-n. In some aspects, the base station router 14 can combine signals from multiple sectors associated with a common telecommunication system operator if the signals are associated with different frequency bands or different non-overlapping segments of the same RF band. Routing the signals can also include transforming the signals into a format used by the remote antenna units (e.g., analog RF signals), and providing the combined signals to the remote antenna units for specific coverage zones.

In some aspects, the base station router 14 can communicate with both the base stations 12a-n and the remote antenna units 18a-p using analog RF signals. The base station router 14 can transform analog RF signals from the base stations 12a-n into digital signals for processing, such as by routing the digital signals and combining the digital signals together. The base station router can transform the digital signals into analog RF signals before providing the signals to the remote antenna units 18a-p.

In other aspects, the base station router 14 can communicate digital signals with the base stations 12a-n and communicate analog RF signals with the remote antenna units 18a-p. Processing signals from the base stations 12a-n can include converting signals in one digital format used by the base stations 12a-n into a different digital format used by the base station router 14. For example, the base station router 14 may convert digital signals in different standardized formats, such as Common Public Radio Interface ("CPRI") or Open Radio Equipment Interface ("ORI"), to a common digital format to process the signals.

In other aspects, the base station router 14 can communicate digital signals with the remote antenna units 18a-p. Processing signals from the base stations 12a-n can include converting signals in one digital format used by the base stations 12a-n into a different digital format used by the remote antenna units 18a-p.

For example, a base station router 14 communicating with remote antenna units 18a-p may receive downlink signals that are digital signals in different standardized formats from the base stations 12a-n. The base station router 14 can convert the downlink signals to digital data streams in a common format and combine the digital data streams into a combined digital data stream. The base station router 14 can provide the combined digital data stream to the remote antenna units 18a-p. Sectors provided as MIMO data streams, for example, can be combined with other digital data streams and provided to a common remote antenna unit. The remote antenna units 18a-p can de-multiplex the combined digital data stream into digital data streams representing individual downlink signals. The remote antenna units 18a-p can convert the digital data streams signals to downlink analog RF signals and radiate the downlink analog RF signals to the wireless devices. For each downlink signal, the base station router 14 can receive a reference clock signal from the base station at which the downlink signal originated. The base station router can use the reference clock signal to synchronize the remote antenna units 18a-p radiating a downlink signal with the base station providing the downlink signal.

In other aspects, the base station router 14 can receive downlink signals that are analog signals from base stations 12a-n. The analog signals can include MIMO signals as streams, or more than one sector of the same operator in the same band segment of the same RF band. At least one of the signals, which may be a second stream of a MIMO signal or a second sector, can be translated in frequency in the base station router 14, and transported over the same communication link as a first signal. A remote antenna unit may be associated with circuitry that can translate the second stream of the MIMO signal or the second sector back to an original frequency. If the signal is the second MIMO stream, the signal can be radiated with the other streams on the same antenna element. If the signal is the second sector, the signal can be radiated by a separate antenna element. A reference clock signal can be provided by the base station router 14 to the DAS 10 to allow the circuitry associated with the remote antenna unit to be synchronized in frequency with the first conversion of the signal.

The coverage zones 16a-f can include the areas to which the DAS 10 extends signal coverage of the base stations 12a-n. For example, if the DAS 10 is positioned in a stadium, the coverage zones 16a-f may correspond to different sections of the stadium and the parking lot surrounding the stadium. In another example, if the DAS 10 is positioned in an office building, each of the coverage zones 16a-f may correspond to a different floor of the building.

Each of the coverage zones 16a-f can each include one or more remote antenna units 18a-p. The remote antenna units 18a-p can service a number of different wireless devices, such as cellular phones, operating in the environment of the DAS 10. The remote antenna units of a particular coverage zone can receive the same group of signals from the base station router 14. The remote antenna units in the coverage zone can radiate the group of signals, such as a sector, received from the base station router 14 to the coverage zone. The remote antenna units 18a-p can communicate with the base station router 14 via any communication medium capable of carrying signals between the base station router 14 and the remote antenna units 18a-p. Examples of a suitable communication medium include copper wire (such as a coaxial cable), optical fiber, and microwave or optical link. The link can transport the signals in analog or in digitized form. As depicted in FIG. 1, different coverage zones can include different numbers of remote antenna units.

In some aspects, the remote antenna units 18a-p can receive analog RF signals from the base station router 14. In other aspects, the remote antenna units 18a-p can each be configured to receive digital signals from the base station router 14 and convert the digital signals to analog RF signals prior to radiating the signals to wireless devices in the coverage zone. The base station router 14 can also generate control signals to control and configure the remote antenna units 18a-p. The control signals can be combined with downlink signals provided to the remote antenna units 18a-p.

In the uplink direction, the base station router can receive uplink signals from remote antenna units 18a-p. Uplink signals can include signals received from wireless devices in the coverage zones 16a-f. The base station router 14 can process uplink signals received from the remote antenna units 18a-p. Processing the uplink signals can include converting the uplink signals to a digital format, filtering the digital uplink signals, adding uplink signals from different zones, and routing. The digital uplink signals can be converted to a format compatible with a given base station, such as analog RF or a standardized digital format, and routed to the base station communicating with the respective wireless devices in a coverage zone.

Figure 2:
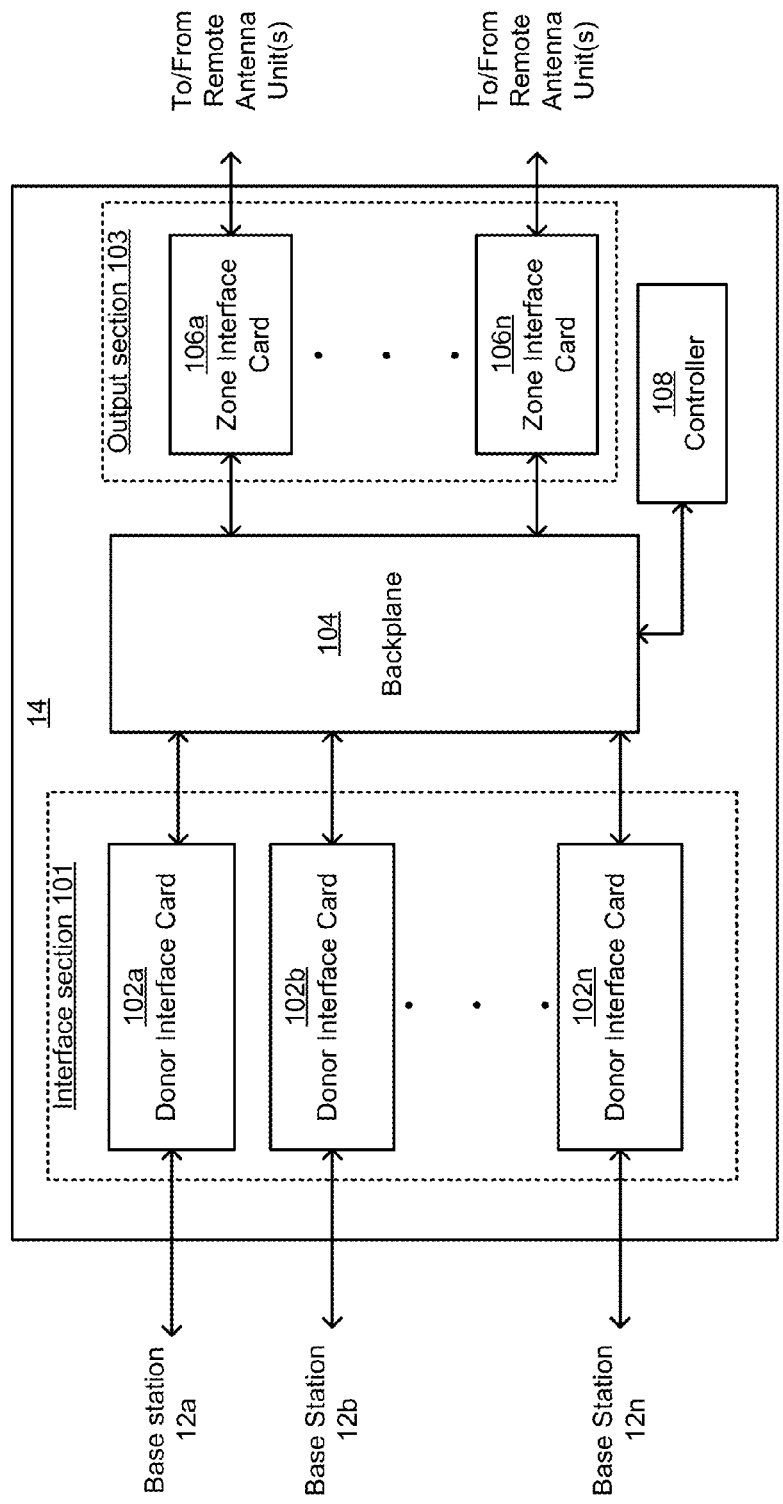
FIG. 2 is a block diagram of a base station router with an interface section, an output section, and a backplane according to one aspect.

FIG. 2 depicts an example base station router 14 having an interface section 101, an output section 103, and a backplane 104. The interface section 101 can include donor interface cards 102a-n. The output section 103 can include zone interface cards 106a-n.

In the downlink direction, the donor interface cards 102a-n can transform signals received from the base stations 12a-n, such as RF signals, into one or more digital data streams. A digital data stream can include a series of digital samples representing a signal. In some aspects, transforming the signals received from the base stations 12a-n can include separately converting analog RF signals into digital data streams by separate analog-to-digital converters. In other aspects, transforming the signals can include converting digital signals in different standardized formats, such as CPRI or ORI data packets, from different base stations into a common digital format for processing at the backplane 104. Certain systems and processes that can be used to do so are described in U.S. Ser. No. 13/493,060, filed Jun. 11, 2012 and titled "Distributed Antenna System Interface for Processing Digital Signals in a Standardized Format."

In the uplink direction, the donor interface cards 102a-n can transform digital data streams into uplink signals to be provided to the base stations 12a-n. The donor interface cards 102a-n can also include circuitry, such as band pass filters, for filtering downlink and uplink signals. Filtering the downlink and uplink signals can eliminate undesirable signals. The filters of the donor interface cards 102a-n can pass desired signals within a frequency band and reject or attenuate undesirable signal components.

In the downlink direction, the digital data streams from the donor interface cards 102a-n can be provided to the backplane 104. The backplane 104 can include configurable digital signal processing circuitry for processing signals from the donor interface cards 102a-n. A non-limiting example of the configurable digital processing circuitry is a field-programmable Gate Array ("FPGA"). The backplane 104 can combine the digital data streams into serialized data streams via the configurable digital signal processing circuitry. In some aspects, the backplane 104 can include a multiplexor device configured for combining the digital data streams by multiplexing parallel digital data streams into a digital data stream. In other aspects, the backplane 104 can include a summing device configured for combining the digital data streams by summing or adding digital data streams.

The combined data streams from the backplane 104 can be provided to the zone interface cards 106a-n. The backplane 104 can also provide combined digital data streams representing the signals of multiple sectors to a single zone interface card. Each of the zone interface cards 106a-n can transform the combined data streams into downlink signals to be provided to the remote antenna units of one or more coverage zones. Each of the zone interface cards 106a-n can simultaneously provide the downlink signals to the remote antenna units of the respective coverage zones. In some aspects, the downlink signals can include analog RF signals of sectors provided from base stations to be radiated by the remote antenna units of a respective coverage zone. In other aspects, the downlink signals can include digital signals of sectors provided from base stations to be provided to remote antenna units of a respective coverage zone. The remote antenna units can convert the digital signals to analog RF signals and radiate the RF signals into the coverage zones.

In an uplink direction, the zone interface cards 106a-n can receive uplink signals from one or more remote antenna units. The uplink signals can be converted to digital data streams and provided to the backplane 104. The backplane 104 can combine the digital data streams into serialized data streams via the configurable digital signal processing circuitry. In some aspects, combining the digital data streams can include multiplexing parallel digital data streams into a digital data stream. In other aspects, combining the digital data streams can include summing or adding digital data streams. The backplane 104 can route the appropriate digital data streams representing uplink signals to the appropriate donor interface card.

The base station router 14 can also include a controller 108. The controller 108 can re-configure the configurable digital signal processing circuitry of the backplane 104 to change the routing of signals from the base stations 12a-n to the coverage zone 16a-f. In some aspects, as depicted in FIG. 2, the controller 108 can be disposed in the base station router 14. In other aspects, the controller 108 can be disposed in a separate device external to and in communication with the base station router 14.

Figure 3:
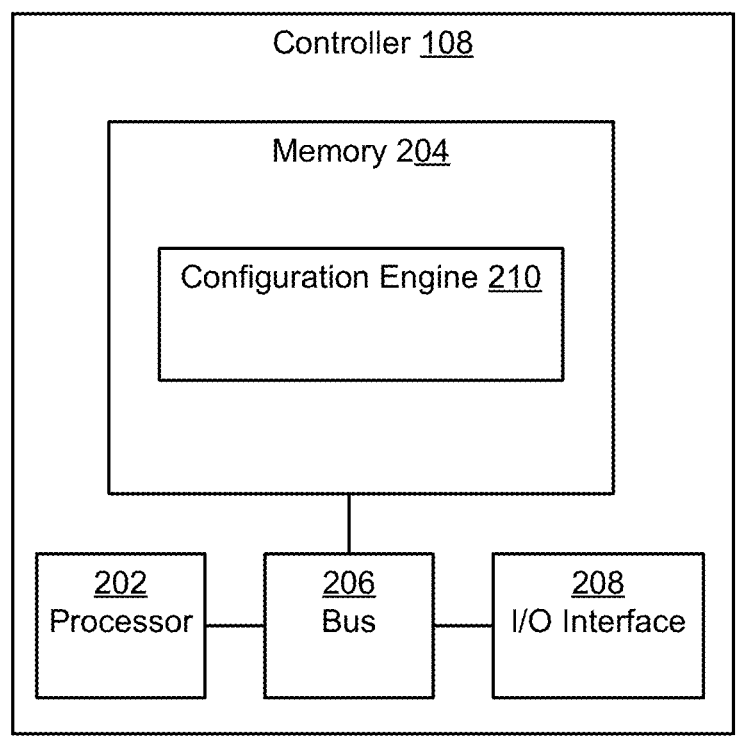
FIG. 3 is a block diagram of a controller for configuring a base station router according to one aspect.

A block diagram of an example controller 108 is depicted in FIG. 3. The controller 108 can include a processor 202 that can execute code stored on a computer-readable medium, such as a memory 204, to cause the controller 108 to configure the base station router 14. Non-limiting examples of a processor 202 include a microprocessor, a peripheral interface controller ("PIC"), an application-specific integrated circuit ("ASIC"), a field-programmable gate array ("FPGA"), or other suitable processor. The processor 202 may include one processor or any number of processors.

The processor 202 can access code stored in memory 204 via a bus 206. The memory 204 may be any non-transitory computer-readable medium capable of tangibly embodying code and can include electronic, magnetic, or optical devices. Examples of memory 204 include random access memory (RAM), read-only memory (ROM), magnetic disk, an ASIC, a configured processor, or other storage device. The bus 206 may be any device capable of transferring data between components of the controller 108. The bus 206 can include one device or multiple devices.

Instructions can be stored in memory 204 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

The instructions can include a configuration engine 210. When executed by the processor 202, the configuration engine 210 can cause the controller 108 to redistribute capacity in the DAS 100, as explained in more detail below. The controller 108 can receive data inputs through input/output ("I/O") interface 208 and store in memory 204. The configuration engine 210 can also provide data outputs via the I/O interface 208. The configuration engine 210 can also execute a scheduling algorithm.

The example configuration for the controller 108 is provided to illustrate configurations of certain aspects. Other configurations may of course be utilized.

The processor 202 can communicate data describing the routing of signals by the base station router 14. The data can be communicated via the I/O interface 208 through a graphical user interface or from an automation algorithm stored in the memory 204 for determining the demand on each of the coverage zones.

The configuration engine 210 can include a configuration management function for determining how to redistribute signal capacity among coverage zones. The configuration engine 210 can execute the configuration management function in response to the detection of a traffic indicator. A traffic indicator can include data describing or otherwise corresponding to a number of mobile devices in each coverage zone. Examples of a traffic indicator can include a scheduled event of a game, concert, or other type of event, a scheduled sequence of events with pre-game, game, and post-game configurations, traffic measurements passing low or high thresholds, base transceiver station failure events, and loss of capacity due to high inter-sector interference. In some aspects, the controller 108 can detect traffic and perform measurements independent of a wireless network standard and protocol.

The configuration engine 210 can also include a report manager function for generating reports on traffic, spurious signals, usage, and other types of information. The processor 202 can execute the configuration engine 210 so as to configure the controller 108 to implement any process for measuring uplink signals for traffic and other types of information, and reporting the information. Certain systems and processes that can be used to do so are described in U.S. Ser. No. 12/778,312, filed May 12, 2010 and titled "System and Method for Detecting and Measuring Uplink Traffic in Signal Repeating Systems."

In some aspects, a base station router 14 can determine a location of a specific wireless device within the environment in which the DAS 10 is deployed. The base station router 14 can communicate with one of the base stations 12a-n to determine an identifier for the specific wireless device. For example, the configure engine 210 can configure the processor of the controller 108 to generate a request for such an identifier to be provided to a base station. An identifier for a wireless device can include any attributes of a communication link between a base station and a wireless device used to identify the wireless device. For example, the identifier can include the transmit and receive frequencies assigned to a wireless device used in frequency division multiple access schemes, a communication time slot assigned to the wireless device used in time division multiple access schemes, and/or a spreading code assigned to a wireless device in a code division multiple access scheme.

The base station router 14 can determine a channel over which the specific wireless device is communicating. The channel can include a connection, such as a transmit and receive frequency or a band of transmit and receive frequencies, over which a wireless device and a base station can communicate via the DAS. A sector of a base station received by a donor card of the base station router 14 can include the channel. The base station router 14 can determine a coverage zone to which the channel is being provided by determining which sector includes the channel and which coverage zone is receiving the sector. For example, the processor 202 can execute the configuration engine 210 to retrieve data describing the assignment of sectors to coverage zones and the respective channels over which the respective sectors are provided to the coverage zones. FIGS. 4 and 5 depict a model of the base station router 14 redistributing capacity among coverage zones 16a-f. The base station router 14 can receive signals from base stations 12a-n corresponding to sectors 302a-c. The base station router 14 can provide the sectors 302a-c to the respective coverage zones 16a-f. Each of the coverage zones 16a-f can include a subset of the remote antenna units, depicted as darkened circles in FIGS. 4 and 5, of the DAS. Increasing the number of coverage zones to which each of the sectors 302a-c is distributed can decrease the capacity density of the respective coverage zones. The base station router 14 can redistribute capacity by changing which sectors 302a-c are provided to which coverage zones 16a-f, respectively.

FIG. 4 depicts the base station router 14, according to an initial configuration, providing sectors 302a-c to the coverage zones 16a-f. The base station router 14 can be configured to communicate the signals of sector 302a to the coverage zones 16a-d, the signals of sector 302b to the coverage zone 16e, and the signals of sector 302c to the coverage zone 16f.

The capacity of sector 302a is divided among the coverage zones 16a-d, while the entire capacity of sector 302b is provided to coverage zone 16e and the entire capacity of sector 302c is provided to coverage zone 16f. Accordingly, the capacity density of each of the coverage zones 16a-d is less than the capacity density of each of the coverage zones 16e-f.

The signals of a sector can be divided among the coverage zones. For example, a first wireless device in the coverage zone 16a may communicate using a first RF channel of sector 302a and a second wireless device in the coverage zone 16a may communicate using a second RF channel of sector 302a. The first and second RF channels of the sector 302a may be included in a common frequency band but be distributed to different coverage areas.

For example, a DAS 10 may service a stadium and a parking lot surrounding the stadium, with the coverage zones 16a-d corresponding to different sections of the stadium and the coverage zones 16e-f corresponding to the parking lot. Before an event hosted in the stadium begins, fewer wireless devices may be concentrated in the stadium than in the parking lot. The coverage zones 16a-d may therefore require less capacity than the coverage zones 16e, 16f. Accordingly, the base station router 14 can be configured to provide the sector 302a to the coverage zones 16a-d, the sector 302b to coverage zone 16e, and the sector 302c to coverage zone 16f. Providing a single sector 302a to the coverage zones 16a-d inside the stadium can provide sufficient capacity density for each of the coverage zones 16a-d. Providing the sectors 302b, 302c to the coverage zone 16e inside the stadium can provide sufficient capacity density for each of the coverage zones 16a-d.

The base station router 14 can be re-configured via the controller 108 in response to changes concentration of wireless devices in the respective coverage zones. FIG. 5 depicts the base station router 14 providing sectors 302a-c to the coverage zones 16a-f according to a subsequent configuration of the base station router 14. For example, if the DAS 10 services a stadium and the surrounding parking lot, more wireless devices will be concentrated inside the stadium than in the parking lot after an event begins. The base station router 14 can be reconfigured such that the sector 302a is provided to the coverage zone 16a, the sector 302b is provided to the coverage zones 16b, 16c, and the sector 302a is provided to the coverage zones 16d-f. The configuration of base station router 14 depicted in FIG. 5 thus increases the capacity density of the coverage zones 16a-d as compared to the configuration of the base station router 14 depicted in FIG. 3.

Although FIGS. 4 and 5 depict three sectors provided to six coverage zones, multiple sectors can be provided to a single coverage zone. For example, the signals of a first sector associated with a first telecommunication system operator and the signals of a second sector associated with a second telecommunication system operator can be combined and distributed to the same coverage zone or group of coverage zones. The number of coverage zones to which a base station router distributes sectors can be greater than or equal to the number of sectors distributed by the base station router.

Figure 6:
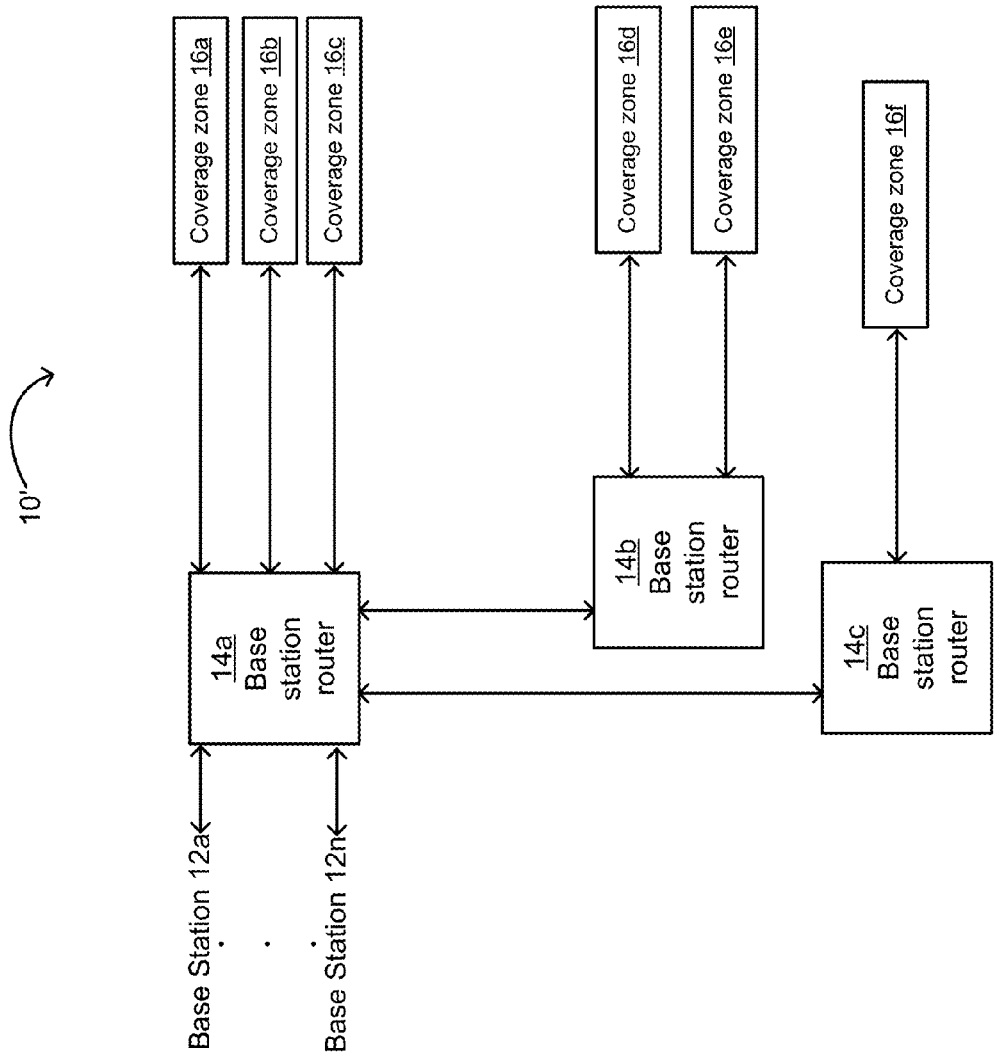
FIG. 6 is a block diagram of interconnected base station routers according to one aspect.

FIG. 6 depicts an aspect of a DAS 10' that includes a base station router 14a in communication with other base station routers 14b, 14c. The interconnected base station routers 14a-c can communicate via any suitable communication medium, such as (but not limited to) copper cable or optical link. The base station router 14a can provide the sectors received by the base station router 14a to the base station routers 14b, 14c. The sectors can be provided as digital data streams. By providing digital data streams to the base station routers 14b, 14c representing the sectors received by the base station router 14a, the DAS 10' can be expanded to provide coverage to a larger environment without requiring additional connections between the base stations 12a-n and the base station routers 14b, 14c.

Figure 7:
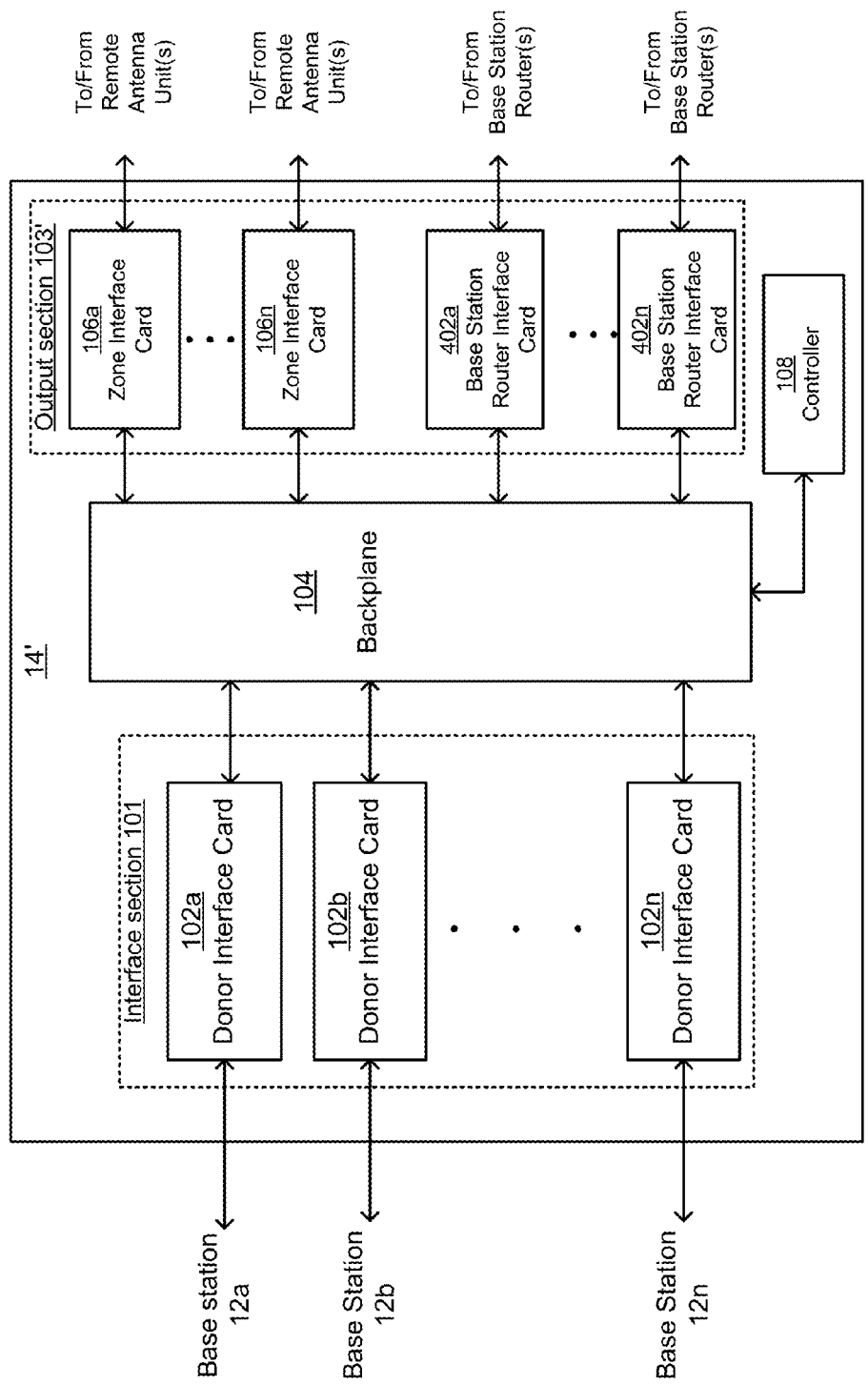
FIG. 7 is a block diagram of a base station router configured to communicate with other base station routers according to one aspect.

FIG. 7 depicts an example base station router 14' having an output section 103' that includes one or more base station router interface cards 402a-n. The base station router 14' can communicate with other base station routers via the base station router interface cards 402a-n. The base station router 14' can either provide sectors to coverage zones via the zone interface cards 106a-n or provide sectors to other base station routers via one or more base station router interface cards 402a-n. Examples of the base station router interface cards 402a-n can include copper or optical interface cards.

Figure 8:
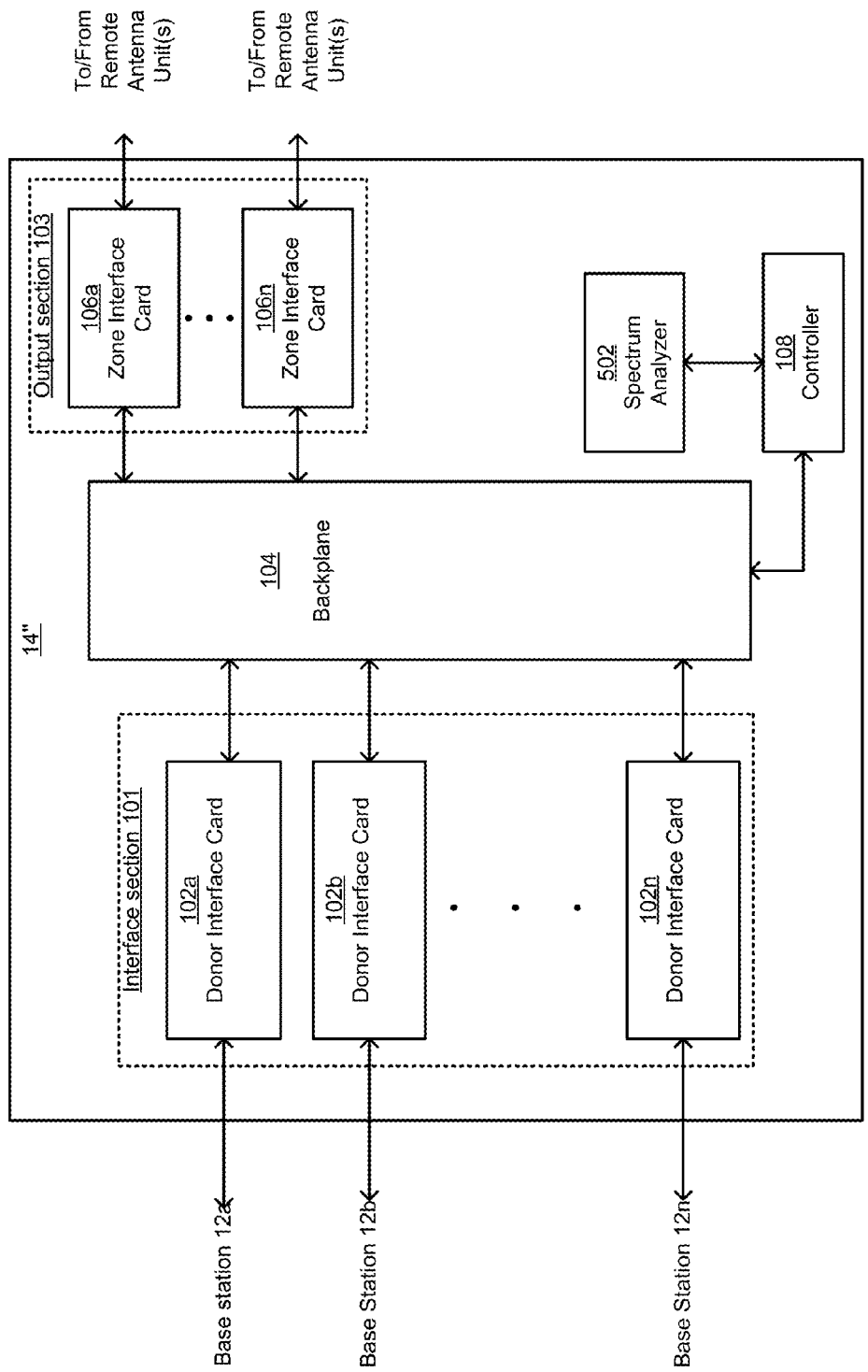
FIG. 8 is a block diagram of a base station router having a spectrum analyzer according to one aspect.

In additional or alternative aspects, a base station router can include a spectrum analyzer. FIG. 8 depicts an example base station router 14" having a spectrum analyzer 502 that can analyze uplink and downlink signals. In some aspects, the spectrum analyzer 502 can be a separate device disposed in the base station router 14", as depicted in FIG. 8. In other aspects, the spectrum analyzer 502 can be disposed in one or more of the donor interface cards 102a-n, the backplane 104, and/or the zone interface cards 106a-n.

The spectrum analyzer 502 can determine the frequencies of the component signals included in the uplink and downlink signals. The spectrum analyzer 502 can store data representing the spectrum of uplink and downlink signals in a memory. The memory can be the memory 208 of the controller 108 or an external memory device accessible by the controller 108 via the I/O interface 208. The controller 108 can use the spectrum of the uplink and downlink signals for additional processing of the uplink and downlink signals. Additional processing can include determining the frequencies being used in a respective coverage zone. The controller 108 can use data describing the frequencies in the respective coverage zones to determine whether to redistribute the capacity of the DAS. Additional processing can also include identifying spurious signals or other undesirable signals, such as noise recovered by the remote antenna units that can distort uplink signals, that can be removed or otherwise filtered using programmable band pass filters disposed in the base station router.

Figure 9:
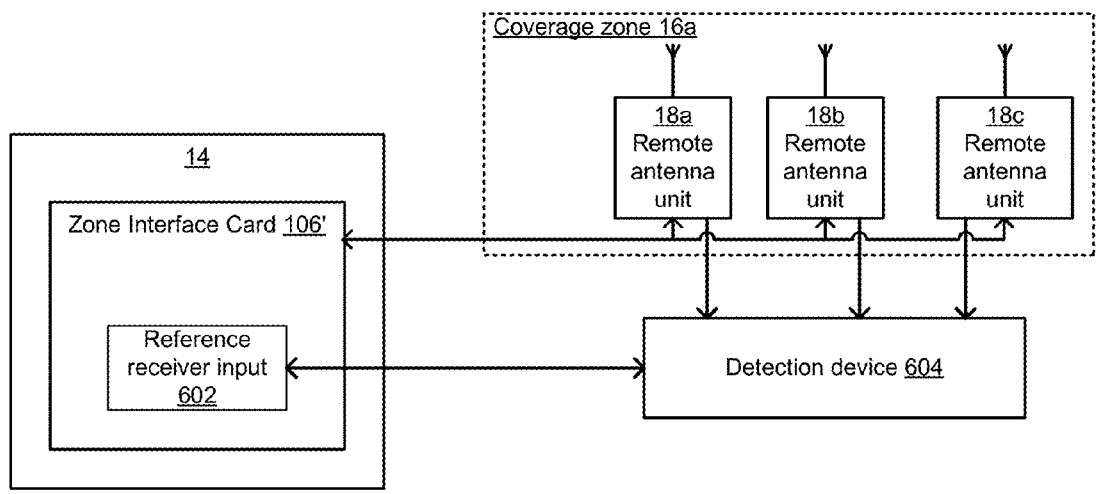
FIG. 9 is a block diagram of a base station router having a zone interface card with a reference receiver input according to one aspect.

In additional or alternative aspects, each of the zone interface cards 106a-n can include one or more reference receiver inputs. FIG. 9 depicts a block diagram of the base station router 14 having zone interface card 106' with a reference receiver input 602.

The zone interface card 106' can communicate via the reference receiver input 602 with a detection device 604 communicatively coupled to each of the remote antenna units included in a coverage zone, such as the remote antenna units 18a-c of the coverage zone 16a. In some aspects, the detection device 604 can be a switch matrix that can allow a connection to the signals of individual remote antenna units prior to the signals being combined.

By communicating via the reference receiver input 602 with a detection device 604, the base station router 14 can detect the geographic location of a particular wireless device in a coverage zone of the DAS 10. The detection device 604 can determine the RSSI of an uplink signal from the wireless device at each remote antenna unit. The base station router 14 can communicate with the detection device 604 to identify which remote antenna unit receives the uplink signal at the strongest RSSI. The base station router 14 can determine that the remote antenna unit receiving the uplink signal at the strongest RSSI is the remote antenna unit associated with the wireless device. The processor 202 of the controller 108 base station router 14 can access a data file stored in the memory 204. The data file can include data describing the geographical location of each remote antenna unit. The processor 202 can determine the geographical location of the wireless device from the data file based on the geographical location of the remote antenna unit that is associated with the wireless device.

The reference receiver input 602 can also provide an output monitoring function for RF or laser pre-distortion. The base station router 14 can provide an identifier for a wireless device, such as a timeslot or spreading code, to the detection device 604 via the reference receiver input 604 of the zone interface card associated with the zone to which the channel is being provided. The detection device 604 can determine which of the remote antenna units receives uplink signals according to the attributes specified in the identifier for the wireless device, such as the time slot or spreading code.

Although a single zone interface card 106' is depicted in FIG. 9, the base station router 14 can include any number of zone interface cards. Although the zone interface card 106' is depicted as having a single reference receiver input 602, the zone interface card 106' can include any number of receiver inputs.

The foregoing description, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example.

The invention claimed is:

1. A base station router configured to be disposed in a distributed antenna system, the base station router comprising:
 a first interface device configured to receive sectors from a base station, each sector comprising a plurality of communication channels to be radiated to mobile devices in coverage zones managed by the base station router and representing an amount of telecommunication capacity for communicating information between the mobile devices and the base station;
 digital signal processing circuitry configured to manage an availability of the sectors for the coverage zones;
 a second interface device configured to communicate with an another device configured to manage an additional availability of additional sectors for additional coverage zones; and
 a controller configured to:
  redistribute the availability of at least one sector from a first coverage zone of the coverage zones managed by the base station router to a second coverage zone of the coverage zones managed by the base station router; and
  redistribute, via the second interface device, the availability of at least one additional sector from the received sectors between at least one of the coverage zones managed by the base station router and at least one of the additional coverage zones managed by the another device, wherein redistributing the availability of the at least one additional sector decreases a capacity density of at least one coverage zone managed by the base station router and increases a capacity density of at least one additional coverage zone managed by the another device.

2. The base station router of claim 1, wherein each communication channel corresponds to a signal configured to carry data.

3. The base station router of claim 1, wherein the plurality of communication channels comprises a plurality of RF channels.

4. The base station router of claim 1, wherein the plurality of communication channels comprises a plurality of digital signals, wherein each digital signal represents an RF channel.

5. The base station router of claim 1, wherein redistributing the availability of the at least one sector comprises increasing the number of communication channels provided to a first remote antenna unit in the first coverage zone and decreasing the number of communication channels provided to a second remote antenna unit in the second coverage zone.

6. The base station router of claim 1, wherein the controller is further configured to:
 execute a scheduling algorithm outputting a traffic indicator; and
 redistribute the availability of the at least one sector from the first coverage zone to the second coverage zone in response to the traffic indicator;
 wherein the traffic indicator comprises a schedule indicator stored in a tangible memory device.

7. The base station router of claim 1, wherein the controller is further configured to:
 identify a spectrum of signals in the first coverage zone and the second coverage zone;
 determine a traffic indicator based on the spectrum of signals; and
 redistribute the availability of the at least one sector from the first coverage zone to the second coverage zone in response to the traffic indicator;
 wherein the traffic indicator comprises a quantity of mobile devices in each coverage zone.

8. The base station router of claim 1, further comprising:
 an interface module configured to transform signals associated with a plurality of sectors into digital data streams;
 wherein the digital signal processing circuitry is further configured to:
  combine a first subset of the digital data streams associated with a first sector into a first combined digital data stream;
  combine a second subset of the digital data streams associated with a second sector into a second combined digital data stream; and
  provide the first combined digital data stream and the second combined digital data stream to a first zone interface card configured to communicate with a first remote antenna unit in the first coverage zone and a second zone interface card configured to communicate with a second remote antenna unit in the second coverage zone.

9. A distributed antenna system, comprising:
 a first remote antenna unit configured to wirelessly communicate with mobile devices located in a first coverage zone;
 a second remote antenna unit configured to wirelessly communicate with mobile devices located in a second coverage zone;
 a base station router configured to:
  receive a sector from a base station; and distribute an availability of the sector to the first remote antenna unit and the second remote antenna unit, the sector comprising a plurality of communication channels and representing an amount of telecommunication capacity; and an another device configured to manage an availability of additional sectors for additional coverage zones, wherein the base station router is further configured to redistribute the availability of at least one additional sector between at least one of: (1) the first coverage zone and the second coverage zone managed by the base station router; and (2) at least one of the additional coverage zones managed by the another device, wherein redistributing the availability of the at least one additional sector decreases a capacity density of at least one of the first coverage zone and the second coverage zone managed by the base station router and increases a capacity density of at least one additional coverage zone managed by the another device.

10. The distributed antenna system of claim 9, wherein each communication channel corresponds to a signal configured to carry data.

11. The distributed antenna system of claim 9, wherein the plurality of communication channels comprises a plurality of RF channels.

12. The distributed antenna system of claim 9, wherein the plurality of communication channels comprises a plurality of digital signals, wherein each digital signal represents an RF channel.

13. The distributed antenna system of claim 9, wherein redistributing the availability of at least one sector comprises increasing the number of communication channels provided to the first remote antenna unit and decreasing the number of communication channels provided to the second remote antenna unit.

14. The distributed antenna system of claim 9, wherein the base station router is further configured to:

execute a scheduling algorithm outputting a traffic indicator; and redistribute the availability of an additional sector from the first coverage zone to the second coverage zone in response to a traffic indicator, wherein the traffic indicator comprises a schedule indicator stored in a tangible memory device.

15. The distributed antenna system of claim 9, wherein the base station router is further configured to:

identify a spectrum of signals in the first coverage zone and the second coverage zone;

determine a traffic indicator based on the spectrum of signals; and redistribute the availability of the at least one sector from the first coverage zone to the second coverage zone in response to a traffic indicator, wherein the traffic indicator comprises a quantity of mobile devices in each coverage zone.

16. The distributed antenna system of claim 9, further comprising:

a plurality of remote antenna units in the first coverage zone; and a detection device configured to:

communicate with a remote antenna unit; and detect a received signal strength indicator associated with an uplink signal transmitted by an identified mobile device;

wherein the base station router comprises a zone interface card configured to communicate with the detection device via a reference receiver input and is configured to determine a geographic location of the identified mobile device based on the respective signal strength of the received signal strength indicator.

17. A method, comprising:

distributing, by a base station router, an availability of a sector received from a base station to a first coverage zone, the sector comprising a plurality of communication channels and representing an amount of telecommunication capacity;

redistributing, by the base station router, the availability of the sector from the first coverage zone to a second coverage zone; and redistributing, by the base station router, an additional availability of at least one additional sector received from the base station between at least one of the coverage zones managed by the base station router and at least one additional coverage zone managed by an another device, wherein redistributing the availability of the at least one additional sector decreases a capacity density of at least one coverage zone managed by the base station router and increases a capacity density of the at least one additional coverage zone managed by the another device.

18. The method of claim 17, wherein redistributing the availability of at least one sector comprises:

increasing the number of communication channels provided to a first remote antenna unit in the first coverage zone; and decreasing the number of communication channels provided to a second remote antenna unit in the second coverage zone.

19. The method of claim 17, further comprising:

detecting a traffic indicator by executing a scheduling algorithm outputting the traffic indicator; and redistributing the availability of the sector from the first coverage zone to the second coverage zone in response to detecting the traffic indicator, wherein the traffic indicator comprises a schedule indicator stored in a tangible memory device.

20. The method of claim 17, further comprising:

redistributing the availability of the sector from the first coverage zone to the second coverage zone in response to detecting a traffic indicator, wherein detecting the traffic indicator comprises:

identifying a spectrum of signals in the first coverage zone and the second coverage zone; and determining the traffic indicator based on the spectrum of signals, wherein the traffic indicator comprises a quantity of mobile devices in each coverage zone.

* * * * *